Figure 8:
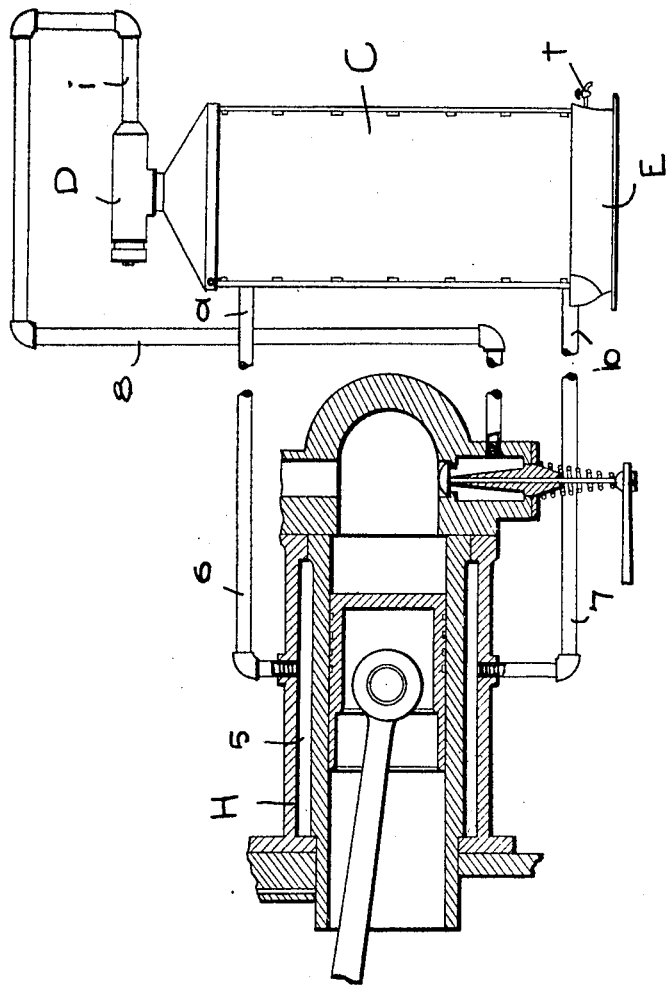

No. 888,206. PATENTED MAY 19, 1908.
F. W. TUERK.
WATER COOLER.
APPLICATION FILED NOV. 16, 1906.
2 SHEETS—SHEET 1.
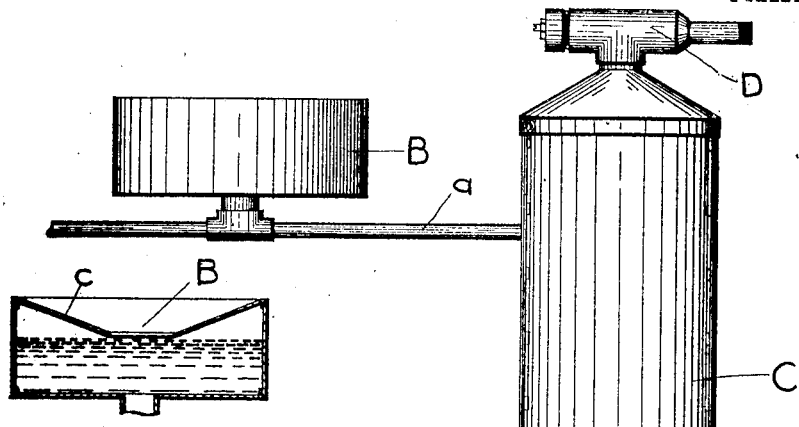
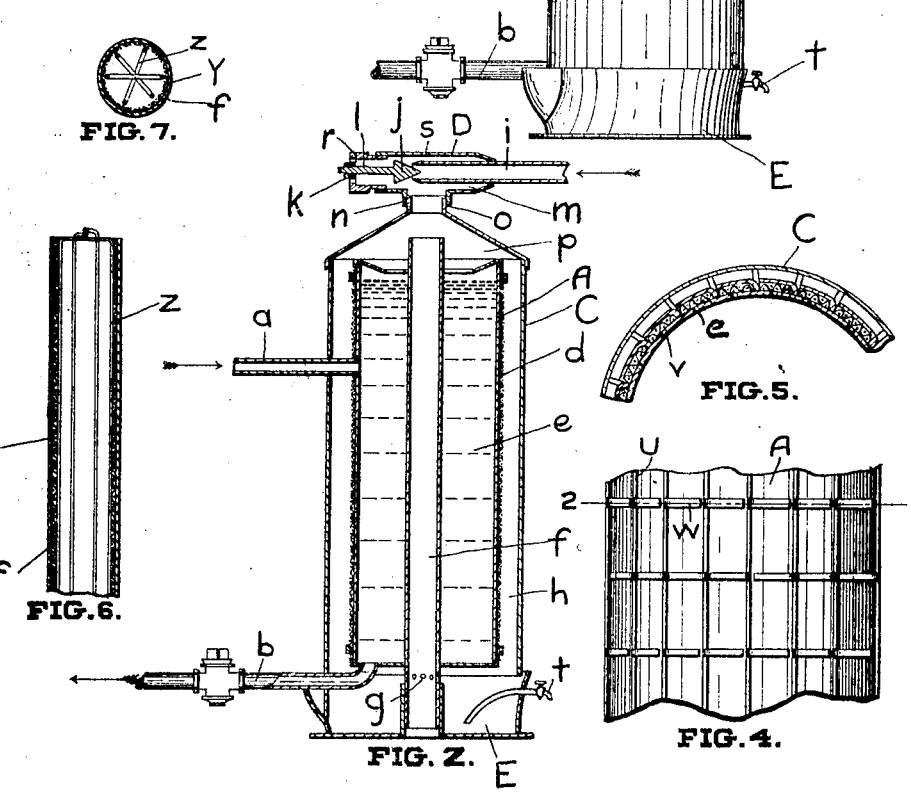
WITNESSES.
INVENTOR.
F. W. TUERK.
BY
ATT'Y.

No. 888,206.

PATENTED MAY 19, 1908.

F. W. TUERK.
WATER COOLER.
APPLICATION FILED NOV. 16, 1906.

2 SHEETS—SHEET 2

WITNESSES.

INVENTOR.
F. W. TUERK.

BY

ATT'Y

UNITED STATES PATENT OFFICE.

FREDERICK WILLIAM TUERK, OF BERLIN, ONTARIO, CANADA.

WATER-COOLER.

No. 888,206.  Specification of Letters Patent.  Patented May 19, 1908.

Application filed November 16, 1906. Serial No. 343,731.

*To all whom it may concern:*

Be it known that I, FREDERICK WILLIAM TUERK, of Berlin, in the county of Waterloo, Province of Ontario, Canada, have invented certain new and useful Improvements in Water-Coolers, of which the following is a specification.

My invention relates to improvements in liquid coolers of the type which are employed to cool the liquid circulated around the cylinders of reciprocating engines. The cooler however, may be used in connection with any form of apparatus where it is desired to cool quickly a circulating mass of fluid.
The objects of the invention are to effect the rapid cooling of the liquid in as small a space as possible utilizing for this purpose the exhaust gases of the engine.

The difficulty with the cooling devices of the present engine is the large size of the tank necessarily employed when no means are provided for directly cooling the liquid. This difficulty is overcome by my device in which I effect the cooling by means of a current of air which as well as producing the ordinary cooling effect evaporates a portion of the liquid exposed to it causing a still further lowering of the temperature. To accomplish this evaporation I provide on the surface of the vessel through which the liquid to be cooled is passed, an absorbent material and feed a portion of the liquid thereto, passing a current of cool air around the exterior of the vessel. This as well as cooling the liquid within the vessel evaporates that held in suspension in the absorbent material on the exterior thereof. I produce this current of air by means of a vacuum exhauster operated by the waste gases of the engine. This exhauster conveniently operates as a muffler to deaden the sound of the discharge of said waste gases.

The details of the device are more fully set forth and described in the accompanying specifications and drawings.

Figure 1 is an elevation of my apparatus. Fig. 2 is a vertical section through the cooler. Fig. 3 is a vertical section through the supply reservoir therefor. Fig. 4 is a side view of a portion of the exterior of an alternative form of vessel through which the cooling liquid is passed. Fig. 5 is a sectional view through the same along the lines 2—2 Fig. 4. Fig. 6 is a longitudinal section through a form of central cooling tube which may extend through the vessel containing the cooling liquid. Fig. 7 is a transverse sectional view through the same. Fig. 8 illustrates the application of the cooler to the cylinder of a gas engine.

In the drawings like letters of reference indicate corresponding parts in each figure.

A is the cooling chamber through which the liquid to be cooled is circulated. In the embodiment illustrated this cooling chamber is cylindrical in form, is disposed vertically and has a supply pipe *a* leading into it near the top thereof and a pipe *b* leading from the bottom thereof for the exit of the liquid. In order to maintain a constant amount of liquid in the cooling apparatus when a portion thereof is evaporated I provide the reservoir B connected to the supply pipe *a* external to the cooling chamber, the level of the liquid in which will be the same as that in the cooling chamber. Preferably this reservoir is provided with a flange *c* secured to the top thereof and downwardly and inwardly extending whereby spilling of the liquid will be prevented.

The pipes *a* and *b* will be connected to the engine cylinder whereby the water circulating therearound will pass through the cooling chamber, the water rising as it is heated and thus creating a continuous circulation.

On the surface of the cooling chamber A an absorbent material *d* such as canvas or the like, is secured. This material may completely cover the surface of the chamber or only partially. In the form shown in Fig. 2 the canvas extends completely around and covers the outer surface of the chamber. Means are provided for always keeping this absorbent material wet with the liquid inside the chamber. The means I show for accomplishing this purpose comprises a plurality of fine perforations *e* through which the liquid feeds to the canvas. Preferably there is also one or more cooling tubes *f* extending through the cooling chamber, the inside of which if desired may be also covered with an absorbent material which is also kept wet by the liquid. The bottom of this tube is provided with perforations *g* for the convenient entrance of the air thereto.

The cooling chamber is closed by an outer casing C of a shape conforming thereto leaving a small space *h* between through which the cooling medium such as air is passed.
While air may be passed between the cooling chamber and the casing by any suitable means, the means which I have devised and consider preferable comprises the vacuum exhauster D located at the top of the casing and operated by the exhaust gases of the engine. This as shown comprises a tube $i$ which is connected to the exhaust of the engine, and which extends into a tubular casing $m$, a conical plug $j$ held in position in front of the end of the tube $i$ by means of a rod $l$ which extends through the casing and is locked in position by a nut $k$. The casing $m$ is held in position by means of a downwardly projecting tubular portion $n$ which also forms an opening in the casing on the bottom thereof having a screw-threaded engagement with an upwardly projecting portion $o$ on the top of the casing C.

The casing $m$ is preferably made in two parts $r$ and $s$ having a screw-threaded engagement with each other whereby the distance between the plug $j$ and the end of the tube $i$ may be adjusted causing a difference in the degree of exhaustion produced. Perforations are provided in the end of the casing for the exit of the exhaust gases. A drip cup E is preferably connected to the bottom of the casing C adapted to catch any water escaping and a small pet-cock $t$ is connected thereto.

In the form of cooling chambers shown in Figs. 4 and 5 the walls of the chamber have secured thereto or formed integral therewith a plurality of longitudinal ribs $u$ which outwardly extend and contact with the inner side of the outer casing C. Between the ribs a number of strips of absorbent material $v$ are secured being preferably held in position by means of tongues $w$ cut in the ribs and bent downwardly against the strips.

The perforations $e$ affording communication between the underside of the ribs and the liquid in the chamber are preferably made under the tongues whereby the tongues will hold the strips of absorbent material against the perforations and prevent an undue escape of liquid therethrough.

In the form of tube shown in Fig. 6 the inner side of the tube has a lining of absorbent material $y$ which is held in position by means of a plurality of spring wire clamps $z$.

A convenient mode of connecting the cooler to the engine cylinder is illustrated in Fig. 8, in which H is any suitable form of gas engine, having a water circulating chamber 5 around the same. 6 and 7 are the supply pipes for this water circulating chamber, which are connected to the inlet and outlet pipes $a$ and $b$ of the cooler. 8 is the exhaust pipes of the engine, which is connected to conduit of the engine, which is connected to the tube $i$ of the exhauster D.

In the operation of the device the inlet and outlet pipes $a$ and $b$ are connected to the engine cylinder as hereinbefore described. The water as heated will circulate through the cooling chambers A. At the same time the exhaust of the engine discharging through the pipe $i$ against the conical plug $j$ which is immediately above the opening in the top of the casing C creates a vacuum producing an upward current of air through the said casing. This passes both on the outside of the cooling chamber and through the tube $f$ in the center thereof. The absorbent material will remain wet in consequence of its being in contact with the liquid in the chamber and the current of air passing along the absorbent material will cause the liquid held in suspension therein to be evaporated producing a well known cooling effect. In addition to this cooling effect there will be the regular cooling of the current of air carrying the heat of the liquid in the chamber away as it passes along the same.

The production of the cooling by the ordinary cooling current and by the evaporation of the liquid itself enables the liquid to be cooled very rapidly and hence avoid the necessity of employing a very large quantity thereof. I have found in practice that I am able to employ a comparatively small cooling chamber and this is of considerable importance in many of the applications to gas engines as for instance their use in automobiles and portable engines on wheels where there is no room for a large cooling device.

It is evident that any kind of absorbent material may be used and that it might be exposed in any desired manner, the essential feature being that a portion of the liquid to be cooled is exposed directly to the action of the current of the cooling medium which causes the said separate portion to be evaporated, the vapors of such evaporation rising and carrying with them a certain portion of the heat of the liquid.

While I have described with great particularity of detail one specific embodiment of my invention yet it is not to be understood therefrom that the invention is limited thereto as certain changes might be made in the details of construction without departing from the spirit of the invention.

What I claim as my invention is:—

1. In a liquid cooling device the combination with the cooling chamber having an absorbent material on the surface thereof and means for moistening the same from the liquid within the chamber of means for passing liquid through the chamber, a casing inclosing the chamber and means for passing air through said casing as and for the purpose specified.

2. An improved cooling device comprising a cooling chamber having a plurality of longitudinal and outwardly extending ribs thereon, a plurality of perforations through the chamber between the ribs, strips of absorbent material secured between the ribs, means for holding the same in position, a casing inclosing the chamber, and means for passing air between the casing and chamber as and for the purpose specified.

3. An improved cooling device comprising a cooling chamber having a plurality of longitudinal and outwardly extending ribs thereon, a plurality of perforations through the chamber between the ribs, strips of absorbent material secured between the same, a plurality of tongues cut in the ribs opposite the perforations and bent down to hold the strips of absorbent material in place, a casing inclosing the chamber and means for passing air between the casing and chamber as and for the purpose specified.

4. An improved liquid cooler comprising a cooling chamber having perforations therein, absorbent material covering said perforations, means for passing liquid through the cooling chamber, a casing inclosing the cooling chamber leaving an air space between, a vacuum exhauster at one end of the casing and a drip cup at the opposite end as and for the purpose specified.

Signed at Berlin, in the county of Waterloo and Province of Ontario, this 8th day of November, 1906.

FREDERICK WILLIAM TUERK.

Witnesses:
 N. E. HELLER,
 ED SCHATZ.